United States Patent [19]

Ito et al.

[11] Patent Number: 5,110,504
[45] Date of Patent: May 5, 1992

[54] LOW FREQUENCY NONLINEAR ELECTRIC MATERIAL AND METHOD FOR GENERATION OF HIGHER HARMONIC WAVE

[75] Inventors: Kohzo Ito, Tsukuba; Yoshikazu Tanabe, Toride; Masa-aki Sato, Tsukuba; Kyoji Kaeriyama, Tsuchiura, all of Japan

[73] Assignees: Agency of Industrial Science & Technology; Ministry of International Trade & Industry, both of Tokyo, Japan

[21] Appl. No.: 329,874

[22] Filed: Mar. 28, 1989

[30] Foreign Application Priority Data

May 16, 1988 [JP] Japan .................. 63-118881

[51] Int. Cl.⁵ ............................ H01B 1/06

[52] U.S. Cl. .................. 252/500; 252/518; 524/80; 524/404; 524/415; 524/419; 526/256

[58] Field of Search ............ 252/500, 518; 526/256; 524/401, 80, 404, 414, 415, 419, 421

[56] References Cited

U.S. PATENT DOCUMENTS

| | | | |
|---|---|---|---|
| 4,711,742 | 12/1987 | Jen et al. | 252/518 |
| 4,737,557 | 4/1988 | Sato et al. | 526/256 |
| 4,877,852 | 10/1989 | Tanaka et al. | 526/256 |

*Primary Examiner*—Josephine Barr
*Attorney, Agent, or Firm*—Oblon, Spivak, McClelland, Maier & Neustadt

[57] ABSTRACT

A polymer produced by removing an electrolytic ion from a polymer doped with the electrolytic ion possesses a nonlinear conductivity. An element made of this polymer, on exposure to a sine wave electric field, generates a higher harmonic wave.

6 Claims, 1 Drawing Sheet

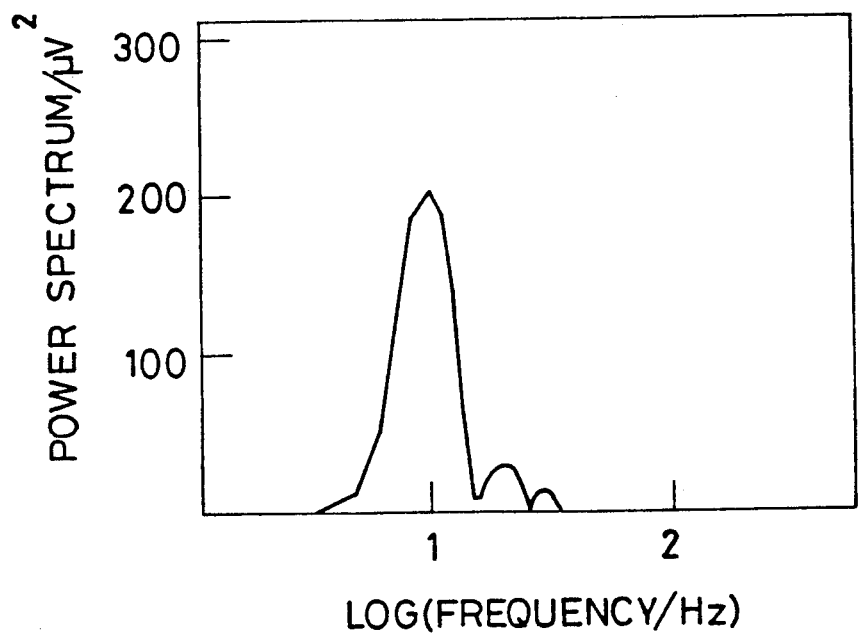

LOW FREQUENCY NONLINEAR ELECTRIC MATERIAL AND METHOD FOR GENERATION OF HIGHER HARMONIC WAVE

BACKGROUND OF THE INVENTION

1. Field of the Invention

This invention relates to a low frequency nonlinear electric material formed of electroconductive polymer and a method for the utilization of the material. More particularly, the electroconductive polymer of this invention is obtained by removing a doped ion from an electroconductive polymer doped with an electrolytic ion and exhibits nonlinear electroconductivity. An element made of this electroconductive polymer generates higher harmonic waves. It is a useful material for nonlinear electric devices, AC/DC transformers, wavelength changing devices, and analogue computers.

2. Prior Art Statement

Nonlinear devices possessing various nonlinear characteristics have been known and have been finding extensive utility as components in the electronic and electrical equipment industry. Typical examples of these nonlinear characteristics are as follows: (1) generation of a DC response to an AC input, (2) generation of a higher harmonic wave, (3) nonproportional and nonlinear response current of the fundamental wave relative to electric field and sudden flow of an electric current due to an increase in the electric field, and (4) generation of a new wave of a frequency, which is the sum, difference, or mixture of different frequencies of two or more input waves. Aside from the nonlinear characteristics enumerated above, the generation of a higher harmonic wave of polymer film occurs exclusively in the following cases: (1) exposure of the polymer in the form of film to an electric field of such a high magnitude as some tens of MV/m, a level sufficient to induce dielectric breakdown of the polymer itself and (2) presence of the frequency region of light in which the polarizability itself of the molecule responding to the electric field stimulus is nonlinear.

OBJECT AND SUMMARY OF THE INVENTION

This invention has been developed for the purpose of providing novel nonlinear devices which are capable of expanding and improving the fields and range of utility found for the conventional nonlinear devices inherently generating higher harmonic waves as described above.

The inventors continued various studies with a view to developing novel nonlinear devices. They have found that the object is accomplished by removing a doped ion from an electroconductive polymer doped with an electrolytic ion. The present invention has been completed on the basis of this finding.

To be specific, this invention is directed to providing a low frequency nonlinear electric material consisting essentially of an electroconductive polymer of a nonlinear conductivity obtained by removing an ion from an electroconductive polymer doped with an electrolyte ion and a method for the generation of a higher harmonic wave by said electric material.

The above and other objects and features of the invention will become more apparent from the following detailed description with reference to the accompanying drawings.

BRIEF DESCRIPTION OF THE DRAWING

The drawing is a graph showing the nonlinear response characteristic exhibited by a film consisting of the electric material of this invention obtained in Example 1 by the removal of a doped ion, when the film was exposed to a sine wave electric field.

DETAILED DESCRIPTION OF THE PREFERRED EMBODIMENTS

Now, the present invention will be described in detail below.

The electroconductive polymer to be used in the present invention is obtained by dissolving a monomer in such a solvent as propylene carbonate and further adding a supporting electrolyte such as tetraethyl ammonium hexafluorophosphate thereto thereby preparing a solution, then subjecting the solution to electrolytic polymerization, and consequently forming on the anode a film of a polymer composition doped with such an electrolytic ion as hexafluorophosphate ion. As regards the electrodes for the electrolytic polymerization, an ITO glass electrode is used as an anode and a platinum plate as a cathode, for example. The polymerization is started after the solution is caused to absorb an inert gas such as argon gas. As concerns the polymerization conditions, the temperature is in the range of $-20°$ to $30°$ C., preferably $-5°$ to $15°$ C., the current density in the range of 0.2 to 100 mA/cm$^2$, preferably 0.5 to 20 mA/cm$^2$, and the polymerization time approximately in the range of 1 second to 10 minutes.

The electroconductive polymers which are advantageously used in this invention include polythiophene; poly(3-substituted thiophenes) such as poly(3-methylthiophene) and poly(3-phenylthiophene); and polyfuran, for example. The polymerization degree of the electroconductive polymer is desired to be in the range of 1,000 to 50 in the case of polythiophene, 1,000 to 50 in the case of poly(3-substituted thiophene), and 1,000 to 50 in the case of polyfuran.

Practically desirable examples of the electrolytic ion which is used for doping the polymer and subsequently removed from the doped polymer are tetrafluoroborate ion, perchlorate ion, and paratoluenesulfonate ion besides the aforementioned hexafluorophosphate ion. Examples of the supporting electrolyte to be used in doping the polymer with the electrolytic ion, therefore, are tetraethyl ammonium hexafluorophosphate, tetraethyl ammonium perchlorate, tetraethyl ammonium tetrafluoroborate, tetraethyl ammonium, and tetraethyl ammonium paratoluenesulfonate.

The amount of the electrolytic ion to be used in doping the polymer is in the range of 0.01 to 0.5, based on the unit of the monomer.

In the present invention, the electroconductive polymer is obtained by removing a doped electrolytic ion from an electroconductive polymer and is in the form of a film. The removal of the doped ion is accomplished, for example, (1) by reversely applying an electric field in the case of a film having a relatively large thickness of not less than 1 $\mu$m or (b) by using a reference electrode in the case of a film not more than 1 $\mu$m in thickness.

The method of (a), for example, comprises keeping the film produced by the polymerization as deposited on the electrode, reversing the polarity of the electrodes, and subjecting the film to electrolytic reduction. As concerns the conditions for this reduction, the temperature is in the range of $-20°$ to $50°$ C., preferably 5 to $20°$ C., the current density in the range of 0.02 to 10 mA/cm$^2$, preferably 0.05 to 2 mA/cm$^2$, and the polymerization time approximately in the range of 5 seconds to 50 minutes. After the electrolytic reduction, the film is washed with a solvent such as alcohol and then dried in a vacuum at a temperature of not less than 100° C., preferably not less than 120° C., for several hours. Thus, the desired film is obtained.

The method of (b), for example, comprises transferring the film produced by polymerization as deposited on the anode to a solution containing a supporting electrolyte such as tetraethyl ammonium hexafluorophosphate, subjecting the anode in the solution to electrolytic reduction against a reference electrode such as Ag/Ag$^+$ under a negative potential preferably in the range of $-0.1$ to $-0.5$ V at a temperature in the range of $-20°$ to $50°$ C. for a period in the range of 1 to 10 minutes, washing the resultant electrolytically reduced film with such a solvent as alcohol, and drying the washed film in a vacuum at a temperature of not less than 100° C., preferably not less than 120° C., for several hours. Consequently, the film aimed at is obtained. The concentration of the supporting electrolyte is generally in the range of 0.02 to 0.5 mol%. The solvent for the aforementioned solution containing the electrolyte is desired to be a polar solvent such as, for example, acetonitrile.

The nonlinear device essentially consists of a low frequency nonlinear electric material of the present invention and generates a higher harmonic wave of the second to third order, for example. The magnitude of this higher harmonic wave is very large, falling in the range of 10 to 50% of the fundamental wave in terms of amplitude. Thus, it is a highly useful material for nonlinear electric devices, AC/DC transformers, wavelength changing devices, and analog computers.

Now, the present invention will be described more specifically below with reference to working examples. It should be noted, however, that this invention is not restricted in any way by these examples. (Production of polymers doped with electrolytic ion)

REFERENTIAL EXAMPLE 1

A solution was prepared by dissolving 2 mmols of 3-methylthiophene in 10 ml of propylene carbonate, and adding thereto 0.083 g (0.3 mmol) of tetraethyl ammonium hexafluorophosphate as a supporting electrolyte.

As the electrodes, an ITO glass electrode was used as an anode and a platinum plate as a cathode. Preparatory to the electrolytic polymerization, the solution was left absorbing argon for 15 minutes. Then, the solution was subjected to the electrolytic polymerization at 5° C. for 72 seconds, with the current density fixed at 10 mA/cm$^2$. Consequently, a blue film of polymer composition (polymerization degree about 500) consisting essentially of poly(3-methylthiophene) doped with hexafluorophosphate ion (doped ion content 0.18 per monomer unit) was obtained on the anode.

REFERENTIAL EXAMPLE 2

A film of polymer composition (polymerization degree about 230) consisting essentially of poly(3-ethylthiophene) doped with hexafluorophosphate ion (doped ion content 0.17 per monomer unit) was obtained on the anode by following the procedure of Referential Example 1, except that 3-ethylthiophene was used in place of 3-methylthiophene and the polymerization time was changed to 2 minutes.

REFERENTIAL EXAMPLE 3

A film of polymer composition (polymerization degree about 380) consisting essentially of polythiophene doped with hexafluorophosphate ion (doped ion content 0.17 per monomer unit) was obtained on the anode by following the procedure of Referential Example 1, except that thiophene was used in place of 3-methylthiophene and the polymerization time was changed to 5 seconds.

REFERENTIAL EXAMPLE 4

A film of polymer composition (polymerization degree about 100) consisting essentially of polyfuran doped with hexafluorophosphate ion (doped ion content 0.25 per monomer unit) was obtained on the anode by following the procedure of Referential Example 1, except that furan was used in place of 3-methylthiophene and the polymerization time was changed to 5 seconds.

REFERENTIAL EXAMPLE 5

A film of polymerization composition (polymerization degree about 110) consisting essentially of poly(3-phenylthiophene) doped with hexafluorophosphate ion (doped ion content 0.19 per monomer unit) was obtained on the anode by following the procedure of Referential Example 1, except that 1 mmol of 3-phenylthiophene was used in place of 3-methylthiophene, the current density was changed to 1 mA/cm$^2$, and the polymerization time was changed to 27 seconds. (Production of low frequency nonlinear electric material of this invention)

PRODUCTION EXAMPLE 1

A film of poly(3-methylthiophene) produced as deposited on the electrode by polymerization effected by the procedure of Referential Example 1 was subjected, with the polarity of the electrode reversed, to electrolytic reduction at 20° C. with a current density of 1 mA/cm$^2$ for 10 minutes, washed with methanol, and dried in a vacuum at 130° C. for 4 hours. Consequently a red film deprived of hexafluorophosphate ion as a dopant, 2 μm in thickness was obtained.

PRODUCTION EXAMPLE 2

An orange film deprived of hexafluorophosphate ion as a dopant, 5 μm in thickness was obtained by following the procedure of Production Example 1, except that poly(3-ethylthiophene) was used in place of poly(3-methylthiophene).

PRODUCTION EXAMPLE 3

A film of polythiophene produced as deposited on the anode by polymerization effected in the same manner as in Referential Example 3 was placed, in situ, in a solution containing tetraethyl ammonium hexafluorophosphate in a concentration of 0.1 M/liter in acetonitrile, subjected in the solution to electrolytic reduction against a reference electrode (Ag/Ag$^+$) at a potential of $-0.3$ V and a temperature of 20° C. for 3 minutes, then washed with methanol, and dried in a vacuum at 130° C. for 4 hours. Consequently, a red film deprived of hexafluorophosphate ion as a dopant, 0.5 μm in thickness was obtained.

PRODUCTION EXAMPLE 4

A reddish purple film deprived of hexafluorophosphate ion as a dopant, 0.3 μm in thickness was obtained by following the procedure of production Example 3, except that poly(3-phenylthiophene) was used in place of polythiophene and the electrolytic reduction against the reference electrode was carried out at a potential of −0.1 V.

PRODUCTION EXAMPLE 5

An orange film deprived of hexafluorophosphate ion as a dopant, 0.2 μm in thickness was obtained by following the procedure of Production Example 3, except that polyfuran was used in place of polythiophene. (Method for generation of higher harmonic wave according to this invention)

EXAMPLE 1

A film of poly(3-methylthiophene), 2 μm thick obtained in a dopant-free state in accordance with this invention by the procedure of Production Example 1, with gold vacuum-deposited on both surfaces as an electrode, was exposed to a sine wave electric field of a frequency of 10 Hz and an amplitude of 100 kV/m. During the exposure to the electric field, the film generated a second-order (20 Hz) and a third-order (30 Hz) higher harmonic wave. The ratios of the second-order and third-order higher harmonic waves to the fundamental wave were respectively 35% and 26% by amplitude.

To test for the frequency dependency of its linear characteristic, the dopant-free film of poly(3-methylthiophene) was exposed to a very weak electric field (about 5 kV/m) such that the generation of higher harmonic wave was negligible. During this exposure, the film showed dielectric relaxation having a relaxation frequency on the order of 1 KHz at room temperature. The relaxation frequency increased exponentially with temperature and reached the neighborhood of 50 KHz at 100° C. The relaxation intensity was about 150 in terms of relative dielectric constant (high-frequency limit about 2). The nonlinear characteristic appeared conspicuously in the frequency region lower than that in which the dielectric relaxation was observed and did not appear at all in the region of higher frequency.

EXAMPLE 2

When a film of poly(3-methylthiophene), 2 μm thick obtained in a dopant-free state in accordance with this invention, with gold vacuum-deposited thereon as an electrode, was exposed to an overlapping sine wave electric field 5 Hz and 20 Hz in frequency, it was observed to generate higher harmonic waves of 15 Hz, 25 Hz, and 35 Hz.

EXAMPLE 3

When a film of polythiophene, 0.5 μm thick produced in a dopant-free state in accordance with the present invention, sandwiched between ITO glass sheets, was exposed to a sine wave electric field 10 Hz in frequency and 100 kV/m in amplitude, it generated a second-order (20 Hz) and a third-order (30 Hz) higher harmonic wave.

EXAMPLE 4

When a film of poly(3-ethylthiophene), 5 μm thick produced in a dopant-free state in accordance with the present invention, sandwiched between ITO glass sheets, was exposed to a sine wave electric field 10 Hz in frequency and 100 kV/m in amplitude, it generated a second-order (20 Hz) and a third-order (30 Hz) higher harmonic wave.

EXAMPLE 5

A film of poly(3-phenylthiophene), 0.3 μm thick produced in a dopant-free state in accordance with the present invention and sandwiched between ITO glass sheets was exposed to a sine wave electric field 10 Hz in frequency and 100 kV/m in amplitude. During this exposure, the film generated a second-order (20 Hz) and a third-order (30 Hz) higher harmonic wave.

EXAMPLE 6

A film of polyfuran, 0.2 μm thick produced in a dopant-free state and sandwiched between ITO glass sheets was exposed to a sine wave electric field 10 Hz in frequency and 100 kV/m in amplitude. During this exposure, the film generated a second-order (20 Hz) and a third-order (30 Hz) higher harmonic wave.

What is claimed is:

1. A low frequency nonlinear electric material, consisting essentially of:
   an electroconductive polymer having nonlinear conductivity and selected from the group consisting of a polythiophene possessing a polymerization degree in the range of 1,000 to 50, a poly(3-substituted thiophene) selected from the group consisting of poly(3-methylthiophene), poly(3-ethylthiophene) and poly(3-phenylthiophene) possessing a polymerization degree in the range of 1,000 to 50 and polyfuran possessing a polymerization degree in the range of 1,000 to 50, said electroconductive polymer being obtained by doping the polymer with at least one electrolytic ion selected from the group consisting of hexafluorophosphate ion, tetrafluoroborate ion, perchlorate ion, and paratoluenesulfonate ion in an amount in the range of 0.01 to 0.5 based on the units of corresponding monomer, and removing said at least one electrolytic ion from the doped polymer.

2. A low frequency nonlinear electrical material according to claim 1, wherein said electroconductive polymer is polythiophene.

3. A low frequency nonlinear electrical material according to claim 1, wherein said electroconductive polymer is poly(3-methylthiophene).

4. A low frequency nonlinear electrical material according to claim 1, wherein said electroconductive polymer is poly(3-ethylthiophene).

5. A low frequency nonlinear electrical material according to claim 1, wherein said electroconductive polymer is poly(3-phenylthiophene).

6. A low frequency nonlinear electrical material according to claim 1, wherein said electroconductive polymer is polyfuran.

* * * * *